(12) United States Patent
Heyring et al.

(10) Patent No.: US 6,499,754 B1
(45) Date of Patent: Dec. 31, 2002

(54) VEHICLE SUSPENSION SYSTEM

(75) Inventors: Christopher Brian Heyring, Eagle Bay (AU); Alexander John Robertson, Dunsborough (AU)

(73) Assignee: Kinetic Limited, Dunsborough (AU)

( * ) Notice: Subject to any disclaimer, the term of this patent is extended or adjusted under 35 U.S.C. 154(b) by 0 days.

(21) Appl. No.: 09/446,318

(22) PCT Filed: Jun. 22, 1998

(86) PCT No.: PCT/AU98/00478

§ 371 (c)(1),
(2), (4) Date: Dec. 20, 1999

(87) PCT Pub. No.: WO98/58811

PCT Pub. Date: Dec. 30, 1998

(30) Foreign Application Priority Data

Jun. 20, 1997 (AU) .............................................. PO7488

(51) Int. Cl.[7] .............................................. B60G 21/05
(52) U.S. Cl. ............................ 280/124.106; 280/124.1; 280/124.07; 280/124.165; 280/124.137; 280/124.103; 280/5.506
(58) Field of Search ....................... 280/124.106, 124.1, 280/124.104, 124.107, 124.164, 124.165, 124.66, 124.167, 124.137, 124.13, 124.134, 124.103, 5.506, 5.507, 5.508

(56) References Cited

U.S. PATENT DOCUMENTS

| | | | | |
|---|---|---|---|---|
| 2,941,815 A | * | 6/1960 | Muller | ........................ 280/112 |
| 3,147,990 A | * | 9/1964 | Wettstein | ..................... 280/104 |
| 3,298,709 A | * | 1/1967 | Mercier | ....................... 280/104 |
| 4,014,561 A | * | 3/1977 | Tomiya et al. | .............. 280/104 |
| 5,324,056 A | | 6/1994 | Orton | |
| 5,480,188 A | * | 1/1996 | Heyring | ..................... 280/772 |
| 5,486,018 A | | 1/1996 | Sakai | |
| 5,839,741 A | * | 11/1998 | Heyring | ............... 280/124.106 |
| 6,142,494 A | * | 11/2000 | Higuchi | ................... 280/93.51 |

FOREIGN PATENT DOCUMENTS

| | | |
|---|---|---|
| DE | 1133638 A | 1/1963 |
| WO | 97/06971 | 2/1997 |

OTHER PUBLICATIONS

K. Newton et al., "The Motor Vehicle," published 1989, by Butterworths p. 827 and figure 35.21.

* cited by examiner

Primary Examiner—Brian L. Johnson
Assistant Examiner—J. Allen Shriver
(74) Attorney, Agent, or Firm—Birch, Stewart, Kolasch & Birch, LLP

(57) ABSTRACT

A suspension system for a vehicle includes two laterally spaced front and rear wheel assemblies, each assembly including a wheel and a wheel mounting, permitting movement of the wheel in a generally vertical direction, bounce support devices supporting the vehicle body, and roll control devices controlling roll attitude. The roll control devices include respective second coupling devices interconnecting the longitudinally adjacent wheel assemblies, and further include transfer devices interconnecting the second coupling devices of each pair of longitudinally adjacent wheel assemblies.

21 Claims, 8 Drawing Sheets

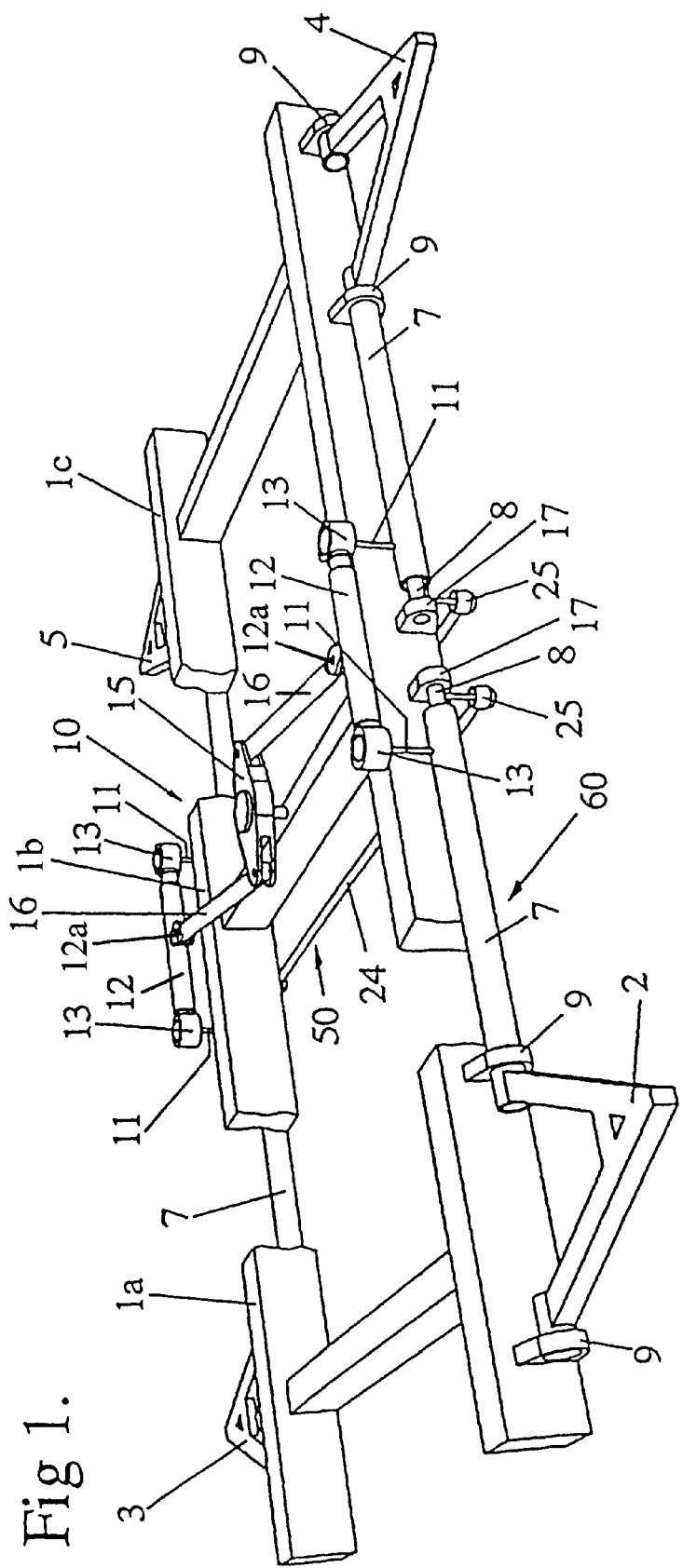
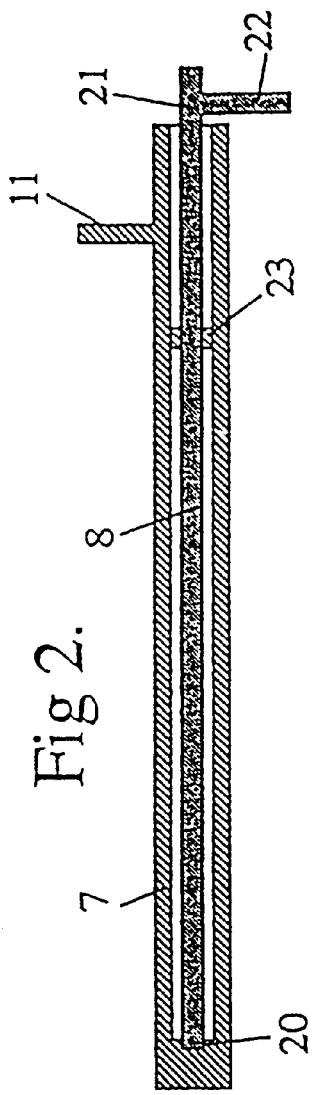
Fig 1.
Fig 2.

VEHICLE SUSPENSION SYSTEM

This application is the national phase under 35 U.S.C. §371 of PCT International Application No. PCT/AU98/000478 which has an International filing date of Jun. 22, 1998, which designated the United States of America.

BACKGROUND OF THE INVENTION

1. Field of the Invention

The present invention is directed to vehicle suspension system for use in automobiles, trucks and other vehicles.

2. Description of the Related Art

In the applicant's earlier Australian patent application No. 19420/95, there is shown a vehicle suspension system including two laterally spaced front wheel assemblies and two laterally spaced rear wheel assemblies. In each of the arrangements described in the above noted patent application, a first coupling means for interconnecting laterally spaced wheel assemblies is respectively provided at the front and the rear ends of the vehicle. Second coupling means for respectively interconnecting the longitudinally adjacent wheel assemblies are provided on each side of the vehicle. The first coupling means primarily support the weight of the vehicle body and provide four wheel bounce resilience whereas the second coupling means provides roll attitude control for the vehicle. In the arrangements described in this patent application, the first coupling means are generally provided by a pair of contra-rotational torsion bars respectively located at the front and rear of the vehicle. The second coupling means are also provided by a pair of contra-rotational torsion bars respectively provided on each side of the vehicle. A lateral roll control arrangement links the second coupling means. This suspension system provides for movement of one wheel in one direction resulting in the longitudinally adjacent and laterally adjacent wheels being respectively urged in the opposite direction. Furthermore movement of both wheels on one side of the vehicle in one direction during roll movement of the vehicle will urge movement of both the wheels on the other side of the vehicle in the same direction to thereby control vehicle roll; Details of the vehicle suspension system described in the above noted patent application are incorporated herein by reference.

It has been found in practice that it is difficult to accommodate a vehicle suspension system of the above noted type into existing vehicles because of the limited space provided under these vehicles and the configuration of the components of the vehicle as they have not been specifically designed to allow for such a vehicle suspension system. More particularly, these above noted types of suspension system may input suspension loads into the body structure at different points to conventional suspension systems. Due to the mechanical advantage (or motion ratio) of some elements of the suspension linkages to the wheel, these suspension loads may cause deflection and therefore noise if input directly into the lightweight structures of modern monocoque (or unitary) construction vehicle body shells.

Additionally, in the suspension system described in the aforementioned Australian application, only one form of low roll stiffness bounce support means is disclosed. It may be advantageous to use alternative arrangements of low roll stiffness bounce support, to facilitate packaging of the suspension system on a wider range of vehicles. Alternatively, it may be advantageous for the roll control arrangement be used in conjunction with conventional independent support arrangements for each wheel, which may provide a roll stiffness and therefore a warp (or cross-axle articulation) stiffness.

SUMMARY OF THE INVENTION

The object of the present invention is therefore to provide a vehicle suspension system of the above noted type that can be accommodated under existing vehicles, preferably without inputting large loads into the body structure of the vehicle.

With this in mind, according to one aspect of the present invention provides a suspension system for a vehicle, the suspension system including:

two laterally spaced front wheel assemblies and two laterally spaced rear wheel assemblies, each wheel assembly including a wheel and a wheel mounting supporting the wheel to permit movement of the wheel in a generally vertical direction relative to a body of the vehicle;

bounce support means for supporting the vehicle body above the wheels and roll control means for controlling a roll attitude of the vehicle body with respect to the wheels;

said roll control means including respective second coupling means interconnecting each wheel assembly to the longitudinally adjacent wheel assembly, and further including transfer means interconnecting the second coupling means of each said pair of longitudinally adjacent wheel assemblies;

said second coupling means being adapted to urge in response to a movement of the wheel of one said wheel assembly in a substantially vertical direction a movement of the wheel of another said wheel assembly connected to said same second coupling means in an opposing direction relative thereto;

said second coupling means also including average movement generating means arranged to generate a movement therein substantially proportional to the average movement of the two wheels connected thereto on one side of the vehicle, said generated average including a factor for the roll moment distribution of the roll control means, the transfer means transferring said generated average movement of said second coupling means to the other said second coupling means on the opposite side of the vehicle;

wherein the loads generated in the average movement generation means and the transfer means are resolved in a localised structural area of the suspension system, and wherein the bounce support means and roll control means respectively provide separate bounce and roll stiffness for the vehicle.

The suspension system can take advantage of spaces located under the vehicle to locate components which resolve the transverse suspension loads (generated in the roll control means) by suitable location of the structural area(s).

The second coupling means may be used on a vehicle provided with conventional independent supports (which provide additional roll stiffness).

However it may be preferable to provide bounce support means including respective first coupling means interconnecting each said wheel assembly to the laterally adjacent wheel assembly to provide a complete suspension system with substantially zero warp (or cross-axle articulation) stiffness.

Alternatively a compromise between conventional independent supports and the preferred interconnected supports may be chosen. The bounce support means for at least one pair of laterally spaced wheel assemblies may include at least a first coupling means interconnecting each said wheel assembly, said first coupling means supporting at least a portion of the load on the associated wheel assemblies whilst providing substantially no roll stiffness.

Where at least one first coupling means is provided, a height adjustment means may also be included to vary the average height of the body with respect to the associated wheels.

The substantially transverse suspension loads generated by the suspension arrangement may be resolved in at least one subframe upon which the vehicle body is supported. The front and rear wheel mountings may be respectively located on separate subframes, the roll control loads being resolved on at least one of the subframes. Alternatively, the roll control loads may be resolved on a further subframe. It is also envisaged that the transverse suspension loads be resolved in at least one reinforced structural area of the vehicle body.

The use of suspension subframes is advantageous for assembly of the vehicle on a production line. Parts or all of the suspension system may be produced as one or more sub-assemblies which are easily attached onto the vehicle body during whole vehicle assembly on a production line. One subframe could be provided with the suspension system attached to allow easy assembly and resolve all the loads.

Each second coupling means may include a roll lever arm for each said wheel assembly, the load in each roll lever arm varying in response to the warp and roll displacements of the wheels with respect to the body, and each second coupling means may include a linkage arrangement interconnecting the roll lever arms, the linkage arrangement of adjacent second coupling means being interconnected by the transfer means, the position of the connection of the transfer means to the linkage arrangements determining the roll moment distribution of the roll control means.

Each second coupling means may include at least one elongate torsion member connected to a said wheel mounting, the associated said roll lever arm extending from each torsion member.

The second coupling means may include a pair of elongate torsion members, one end of each torsion member being connected to and extending from a said wheel mounting, the other end of each torsion member including a roll lever arm extending from the torsion member, the roll lever arms being interconnected to by a linkage arrangement, the linkage arrangement of adjacent second coupling means being interconnected by the transfer means.

It is however also envisaged that the torsion members on both sides of the vehicle be aligned in an "X" configuration, with the transfer means located at a central location between the four wheel assemblies. In this configuration, the major rotational axes of the components of the first and second coupling means (ie the torsion members) are generally aligned towards a said structural area where loads from the first and second coupling means are resolved.

There are different methods which may be used to achieve the desired results from the transfer means. For example, the transfer means may include a Watts link.

Alternatively, if the roll lever arms of one said second coupling means are arranged to point substantially upwards and the roll lever arms of the other second coupling means on the opposite side of the vehicle point substantially downwards, then the transfer means interconnecting the linkage means may be a member which is substantially aligned with a transverse axis across the vehicle. This arrangement is a lever analogy of the gear arrangement shown in FIG. 3 of the Applicant's above-mentioned Australian patent application No. 19420/95, which could also be used.

The linkage arrangement may include a flexible connection means at each end thereof for providing the respective connection to each roll lever arm.

According to a first possible arrangement, the first coupling means of at least one pair of laterally adjacent wheel assemblies may include a bounce lever arm for each wheel assembly, the load in each bounce lever arm varying in response to the bounce displacements and loads on the associated wheel assemblies. The first coupling means may further include a connection means interconnecting the bounce lever arm of one wheel assembly with the bounce lever arm of the laterally adjacent wheel assembly.

At least one of the first coupling means may include at least one torsion bar interconnected between at least one wheel mounting and the associated bounce lever arm.

The torsion members of at least one second coupling means may be hollow, a said torsion bar of the first coupling means being located within each said torsion member, with one end of the torsion bar being fixedly connected to the torsion member.

The bounce lever arm may extend from the end of the torsion bar opposite to the fixed end thereof. Alternatively, an aperture may be provided through the wall of the torsion member to provide clearance for the bounce lever arm to extend from the torsion bar. This provides a relatively compact arrangement which can more readily be positioned into a vehicle.

At least one of the torsion members of the second coupling means may include a bar extension from the torsion member, the bar extension forming part of the first coupling means. The bar extension may be integral with or fixedly secured to the torsion member. The bar extension may include a bounce lever arm extending therefrom. The first coupling means may also include a resilient means coupled at each end thereof to the bounce lever arms of laterally spaced bar extensions of the torsion members.

The connection means of the bounce supports may be a relatively rigid member interconnecting the bounce lever arms of laterally adjacent torsion bars.

Alternatively, the connection means interconnecting the bounce lever arms of laterally adjacent torsion bars may include a resilient means.

The resilient means may include a spring member and/or an hydraulic ram in fluid communication with an accumulator.

According to a second aspect of the invention, the first coupling means of at least one pair of said laterally adjacent wheel assemblies may include a pair of fluid rams, the fluid rams being respectively connected to the wheel mounts of laterally adjacent wheel assemblies, the hydraulic rams being connected by a fluid conduit to provide fluid communication therebetween, and an accumulator located on the fluid conduit.

According to yet another aspect of the present invention, there is provided an elongate suspension member for a vehicle suspension system including a tubular member, and a torsion bar accommodated within the tubular member, one end of the tubular member being fixedly secured to a wheel assembly, the other end being connected to one end of the torsion bar. A lever arm may extend from the other end of the torsion bar, the lever arm being connected to the lever arm associated with the laterally adjacent wheel assembly.

According to yet another alternative, one end of the vehicle may include different types of the first coupling means described above at different ends of the vehicle.

According to another aspect of the invention, there is provided a vehicle incorporating a suspension system including any aspects of the above described invention.

It will be convenient to further describe the invention by reference to the accompanying drawings which illustrate preferred embodiments of the invention. Other embodiments of the invention are possible, and consequently the particularity of the accompanying drawings is not to be understood as superseding the generality of the proceeding description of the invention.

BRIEF DESCRIPTION OF THE DRAWINGS

In the drawings:

FIG. 1 is a perspective view of a first preferred embodiment of a vehicle suspension system according to the present invention;

FIG. 2 is a detailed cross-sectional view of a part of the vehicle suspension system of FIG. 1 showing a torsion member accommodating a torsion bar;

DETAILED DESCRIPTION OF THE PREFERRED EMBODIMENT

Figure 3:
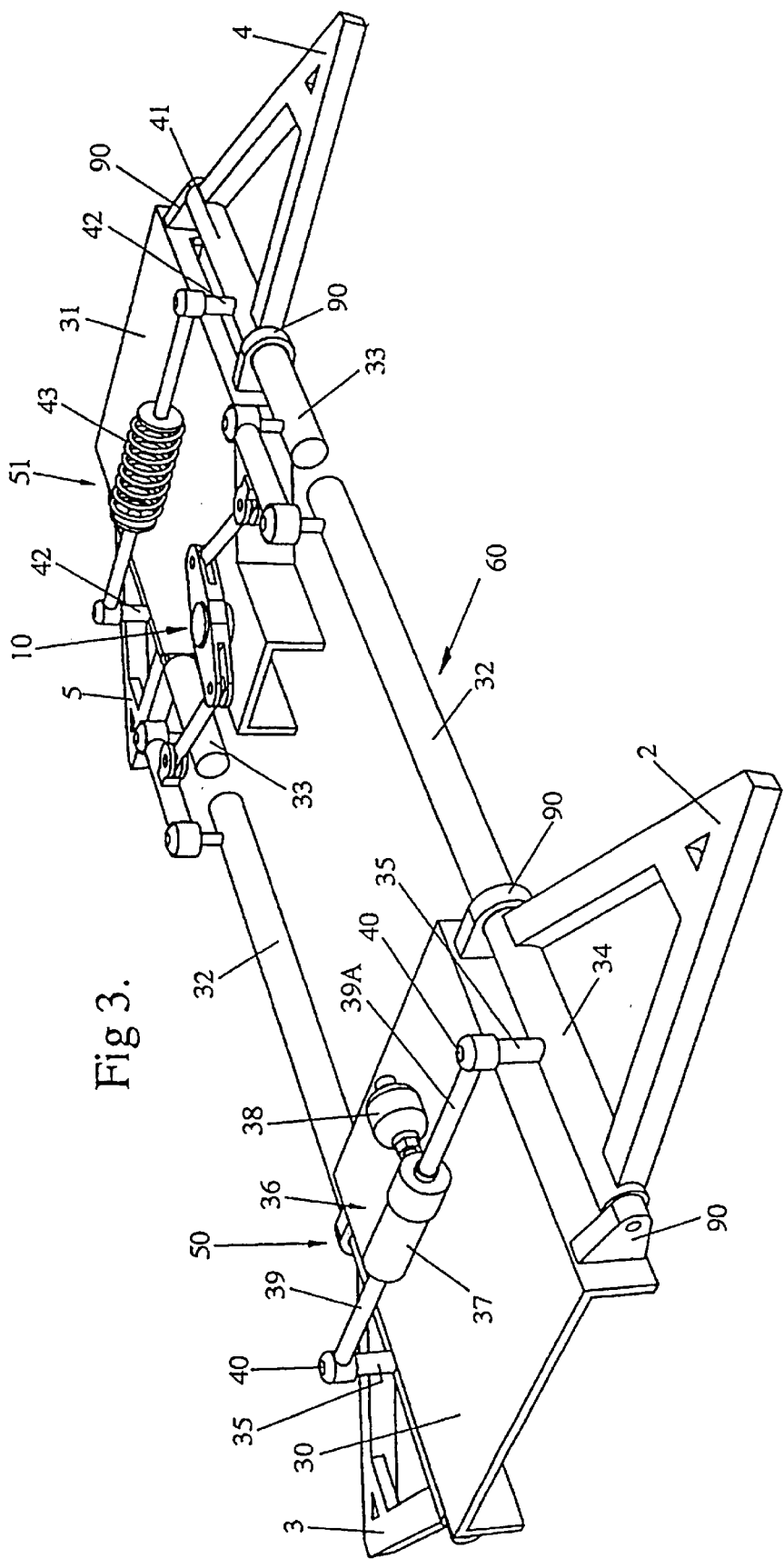
FIG. 3 is a perspective view of a second preferred embodiment of a vehicle suspension system according to the present invention.

Referring initially to FIG. 1, there is shown a vehicle suspension system including a front, middle and rear subframe 1a, 1b, 1c. A pair of laterally adjacent front A-frames 2, 3 are pivotally mounted on the front subframe 1a and a pair of laterally adjacent rear A-frames 4, 5 are pivotally mounted on the rear subframe 1c on brackets 9 extending from the respective subframes 1a, 1c. The A-frames 2, 3, 4, 5, also known as "wishbones" carry the wheels (not shown) which support the vehicle. The wheels are able to move in a generally vertical direction relative to the subframes.

A first coupling means 50 interconnects the two laterally adjacent front wishbones 2, 3. A further first coupling means 50 interconnects the laterally adjacent rear wishbones 4, 5. Furthermore, the wishbones 2, 4 on the left side of the vehicle are interconnected by means of a second coupling means 60. The wishbones 3, 5 on the right hand side of the vehicle are similarly interconnected by a second coupling means 60.

The second coupling means 60 includes a pair of torsion members 7, or "roll tubes", located on each side of the subframes. Each roll tube 7 is fixed to or integral with an adjacent wishbone. A roll lever arm 11 extends from each roll tube 7. A linkage member 12 interconnects adjacent roll tubes 7. The linkage member 12 is coupled via a flexible junction 13 to the roll lever arm 11 of each roll tube 7. The linkage members 12 are interconnected by a transfer means 10, shown here in the form of a "Watts" linkage including a central Watts link 15 pivotally mounted on the middle subframe 1b. Extension arms 16 extend from each end of the Watts link 15 to connect the Watts link 15 to each link member 12. Each extension arm 16 are hingedly connected at opposing ends thereof to the Watts link 15 and to pivot point 12a on the link member 12 respectively. The above arrangement of the roll tubes 7 and the Watts linkage 10 provide roll attitude control for the vehicle suspension system.

The central roll load transfer means 10, may be accomplished using other arrangements, such as a linkage version of the gear arrangement shown in FIG. 3 of the Applicant's aforementioned Australian patent application No. 19420/95. For example, the roll lever arms 11 may extend from the roll tubes 7 in a generally upwards direction on one side of the vehicle, and in a generally downwards direction on the opposite side on the vehicle. The linkage means 12 interconnecting the roll lever arms of adjacent roll tubes may then be interconnected by a simplified transfer means in the form of a beam member. In this arrangement it may be preferable to run the roll tubes on one side of the vehicle upwards towards the transfer means (with respect to the lines of the roll tubes on the other side of the vehicle) such that the roll lever arms of both second coupling means and the transfer means may be packaged into a volume of reduced overall height.

The first coupling means 50 includes a torsion bar 8 accommodated within each roll tube 7 as best shown in FIG. 2. The torsion bar 8 has a fixed end 20 fixedly secured to the roll tube 7. The torsion bar 8 also has a free end 21 extending from the roll tube 7. A bounce lever arm 22 extends from the torsion bar free end 21. A locating bearing 23 locates the torsion bar 8 within the roll tube 7.

The torsion bar free end 21 is pivotally supported within a bracket 17 extending from the vehicle frame 1.

Each laterally adjacent pair of torsion bars 8 are interconnected by means of a transverse bounce bar 24. The bounce bar 24 is connected at each end of by means of a flexible connection 25 to the bounce lever arm 22 of each torsion bar 8.

Because the torsion bars 8 are fixedly connected to the roll tubes 7 which in turn is fixedly connected to the wishbones 2, 3, 4, 5, the interconnected torsion bars 8 act to support the weight of the vehicle and provide four wheel bounce resilience. However, as the torsion bars 8 are not mechanically resolved directly to the vehicle frame 1 and are only joined transversely to one another, they do not afford any roll attitude support themselves. It should also be noted that although the roll tubes 7 are hollow, they are still torsionally relatively rigid. There is only sufficient torsional flexibility to allow for any roll bounce requirements.

FIG. 3 shows an alternative possible arrangement according to the present invention and integers corresponding to integers in FIG. 1 are provided with the same reference numeral for clarity purposes. The vehicle frame 1 of FIG. 1 is replaced by a front vehicle sub frame 30 and a rear vehicle sub frame 31. The front vehicle sub frame 30 supports the front wishbones 2, 3 while the rear vehicle sub frame 31 supports the rear wishbones 4, 5. The wishbones are supported for pivotal movement on brackets 90 extending from the front and rear sub frames 30, 31 respectively.

This arrangement also provides a first coupling means 50, 51 and a second coupling means 60 according to the present invention. The second coupling means 60 includes a long torsion member 32 and a short torsion member 33 respectively located on each side of the vehicle. These torsion members 32, 33 are solid and not hollow as shown in FIG. 1. The torsion members 32, 33 are however also interconnected by a Watts linkage 10 in a similar manner as in FIG. 1.. The difference is that the Watts linkage 10 has been moved away from the centre of the vehicle as shown in FIG. 1 towards the rear of the vehicle as shown in FIG. 3. This arrangement is preferable because there is generally a greater amount of floor height and space towards the rear of the vehicle. This is clearly shown in FIG. 7. The location of many of the components of the suspension system towards the rear of the vehicle facilitates packaging of the vehicle suspension system within the vehicle. Also, as the Watts linkage 10 transmits roll forces between the torsion members 32, 33 on either side of the vehicle, this resolves all the high roll forces within the rear sub frame 31.

FIG. 3 shows the torsion members 32, 33 being integral or fixedly secured to the respective wishbones 2, 3, 4, 5. It is however to be appreciated that the torsion members 32, 33 may alternatively be connected to the wishbones by way of drop links. The first coupling means 50, 51 is provided at the front end of the vehicle by a front bar extension 34 which is integral with or fixedly secured to the long torsion member 32 and front wishbone 2, 3. A bounce lever arm 35 extends from the front bar extension 34. A resilient means 36 interconnects the bounce lever arms 35 of the laterally adjacent front bar extensions 34. The resilient means 36 includes a hydraulic ram 37 and associated accumulator 38. The ends of the hydraulic ram 37 are respectively coupled to the bounce lever arms 35 by a piston rod 39 extending from one end of the hydraulic ram 37 and a connection arm 39a extending from the other end of the hydraulic ram 37, the peripheral end of the piston rod 39 and the connection arm 39a being coupled to the respective bounce lever arm 35 by means of a resilient connector 40.

The first coupling means of the rear vehicle sub frame 31 is similar to that of the front vehicle sub frame 30 in that each short torsion member 33 of the second coupling means is respectively integral with or fixedly coupled to a rear bar extension 41 for the first coupling means 51. The rear bar extension 41 is integral with or fixedly coupled to a respective rear wishbone 4, 5. Each bar extension 41 includes a bounce lever arm 42 with a resilient means 43 interconnecting the bounce lever arms 42 of the laterally adjacent rear bar extensions 41. The first coupling means 51 of the rear vehicle sub frame 31 differs from the first coupling means 50 of the front vehicle sub frame 30 in that the resilient means 43 is provided by a coil spring in place of a hydraulic ram 37. The first coupling means 51 of the rear vehicle sub frame 31 otherwise operates in the same manner.

Figure 4:
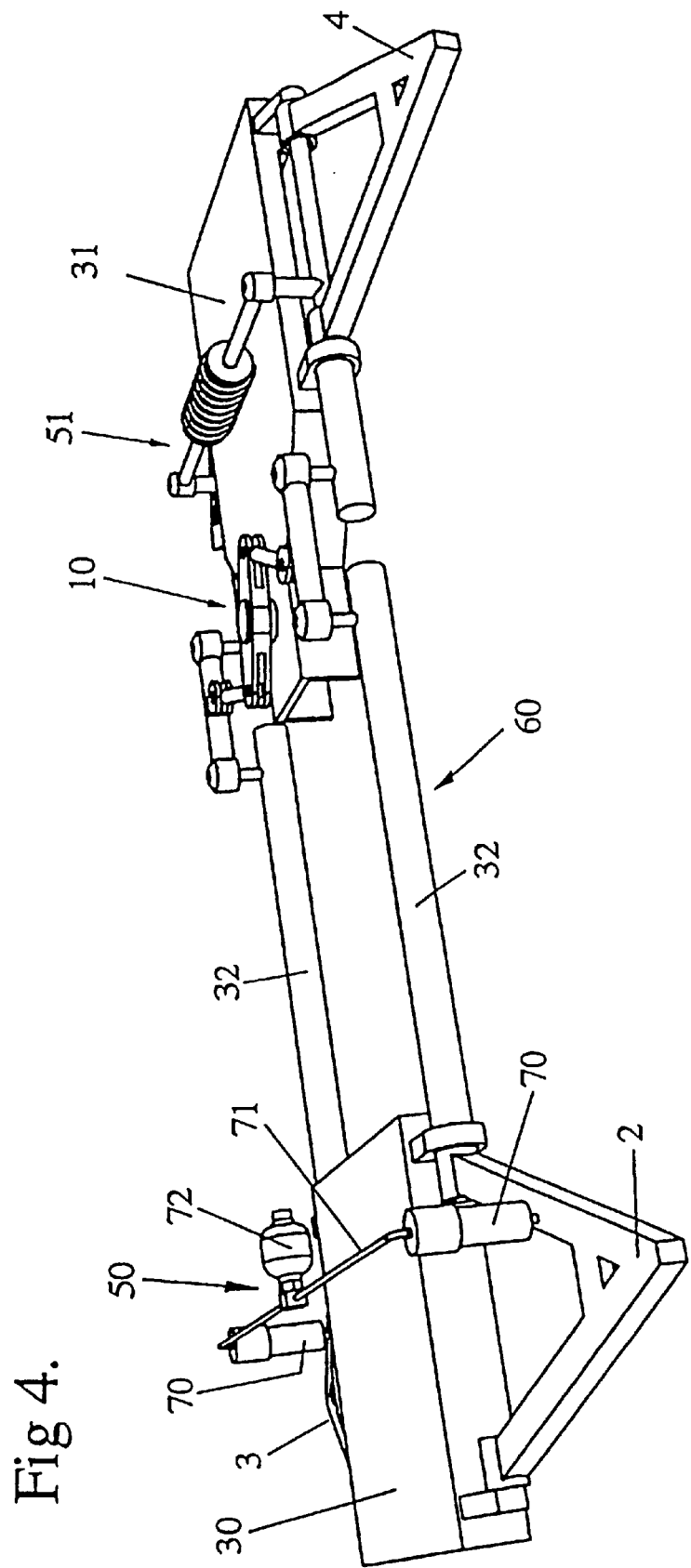
FIG. 4 is a perspective view of a third preferred embodiment of a vehicle suspension system according to the present invention.

The vehicle suspension system shown in FIG. 4 is generally the same as the system shown in FIG. 3 except that the first coupling means 50 of the front vehicle sub frame 30 is provided by a pair of hydraulic rams 70, each hydraulic ram 70 being provided between a front wishbone 2, 3 and the vehicle chassis (not shown). The hydraulic rams 70 are joined by a transverse conduit 71 to allow fluid communication between the rams 70. An accumulator 72 is provided in the transverse conduit 71. The long torsion members 32 of the second coupling means 60 are integral with or fixedly secured to the respective front wishbones 2, 3. There is however no bar extension 34 as shown in FIG. 3. The arrangement of the first coupling means 51 on the rear vehicle sub frame 31 is however identical to that shown in FIG. 3.

Figure 5:
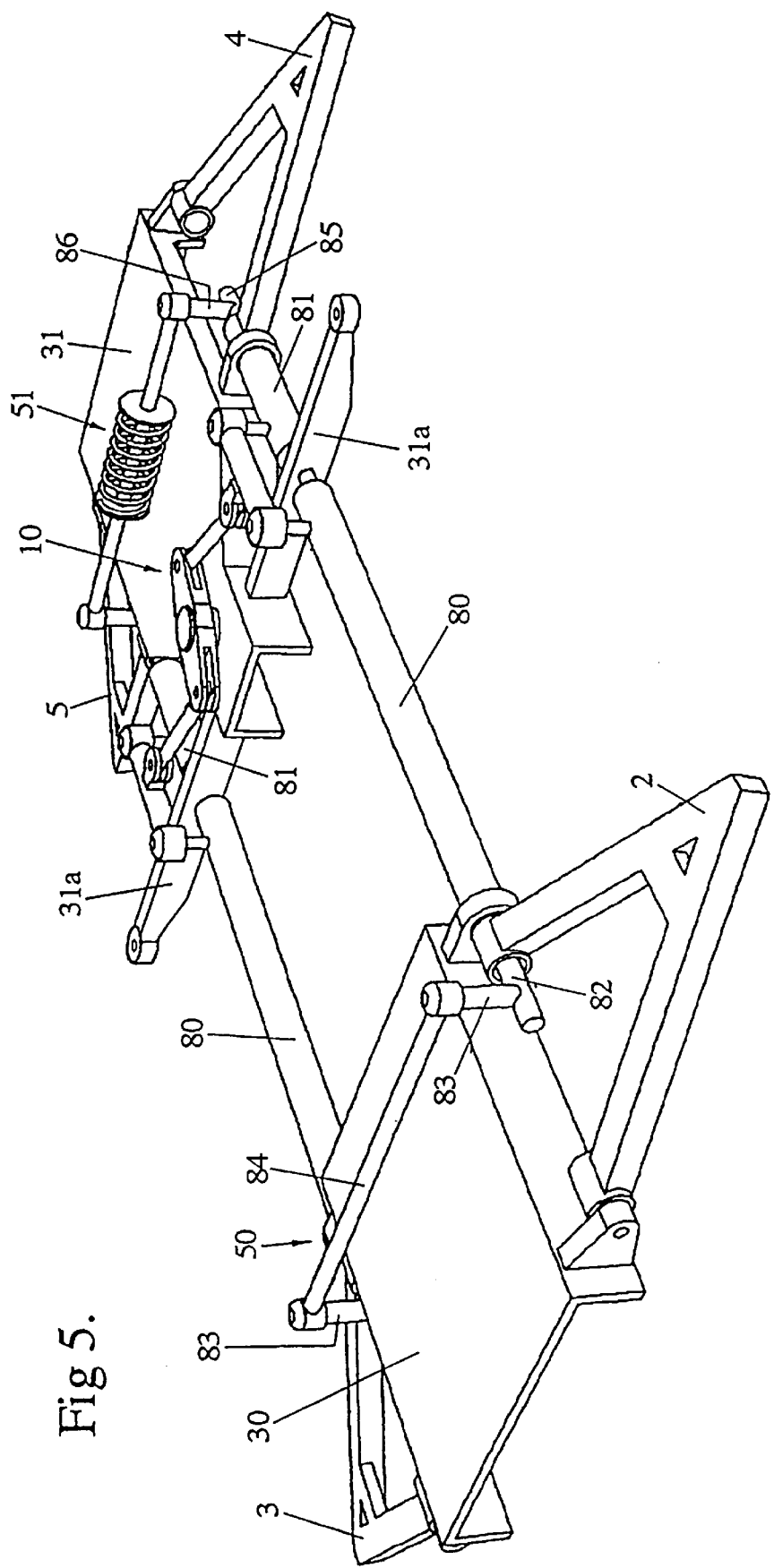
FIG. 5 is a perspective view of a fourth preferred embodiment of a vehicle suspension system according to the present invention.

In FIG. 5, the second coupling means is provided with a roll tube 80 fixedly coupled to a front wishbone 2, 3 and a rear torsion member 81 fixedly coupled to a respective rear wishbone 4, 5. The first coupling means 50 of the front vehicle sub frame 30 includes a torsion bar 82 located within tubular member 80 in the same manner as shown in FIG. 2. A bounce lever arm 83 extends from the end of the roll bar 82 extending from the end of the roll tube 80. The lever arms 83 of the laterally adjacent torsion bars 82 are interconnected by means of a rigid link member 84. The resilience of the first coupling means 50 is provided by the torsion bars 82 which normally or beneficially extend greater than one half the length of the vehicle to provide sufficient resilience whilst not diminishing the longevity of the torsion bars 82.

The first coupling means 51 of the rear vehicle sub frame 31 has a similar arrangement to that shown in FIGS. 3 and 4 except that only a short rear bar extension 85 extends from the torsion member 81. A bounce lever arm 86 extends from each rear bar extension 85, with the bounce lever arms 86 being interconnected by a resilient means 51 in the same manner as shown in FIGS. 3 and 4. Additionally, the subframe 31 incorporates extra members 31a which extend laterally across the vehicle and include mounting points for the torsion members 80 and 81. These extra members resolve the lateral forces generated in the torsion members and their interconnecting linkage arrangement, and include mounts at their ends to help input roll forces into the body structure. This is an example of how a roll load subframe may be incorporated into one of the front or rear suspension mounting subframes to resolve suspension loads within localised structures, thereby limiting the loads input into the body shell. Although these extra members 31a are only shown in FIG. 5, they may also be used in any of the arrangements shown in FIGS. 3 to 7.

Figure 6:
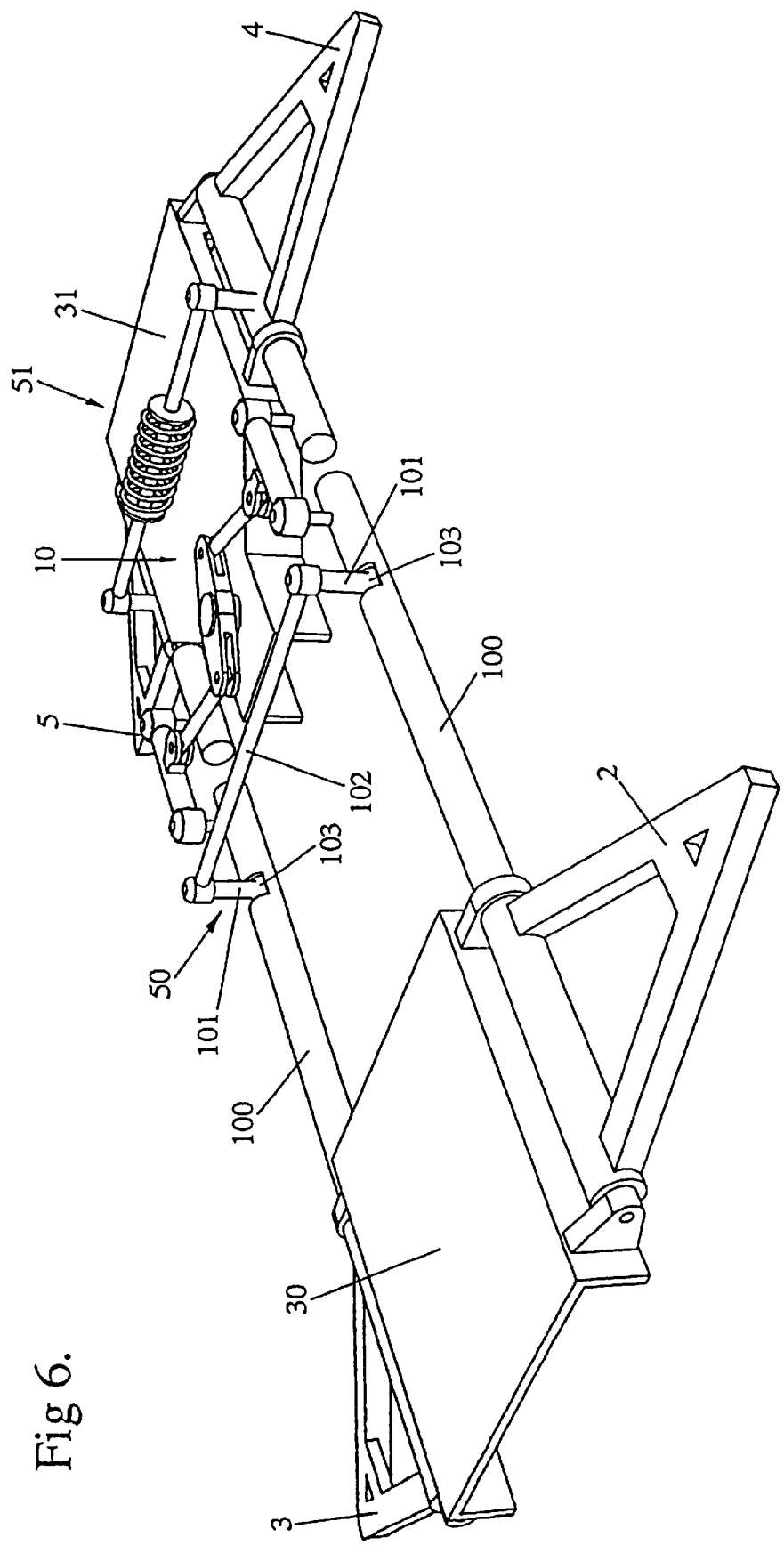
FIG. 6 is a perspective view of a fifth preferred embodiment of a suspension system according to the present invention.

The vehicle suspension system shown in FIG. 6 is generally the same as the suspension system shown in FIG. 5. The various components on the rear vehicle sub frame 31 is identical in both arrangements. The primary difference is in the layout of the components on the front vehicle sub frame 30. In particular, the roll tubes 100 fixedly coupled to the front wishbones 2, 3 include an aperture 103 passing through the side of each roll tube 100. A torsion bar (not shown) is accommodated within each roll tube 100. A bounce lever arm 101 extends from each torsion bar through the aperture 103. The bounce lever arms 101 are then joined by a rigid link member 102 to thereby provide the first coupling means 50 for this arrangement. The first coupling means 50 of this arrangement operates in the same manner as the first coupling means shown in FIG. 5.

Figure 7:
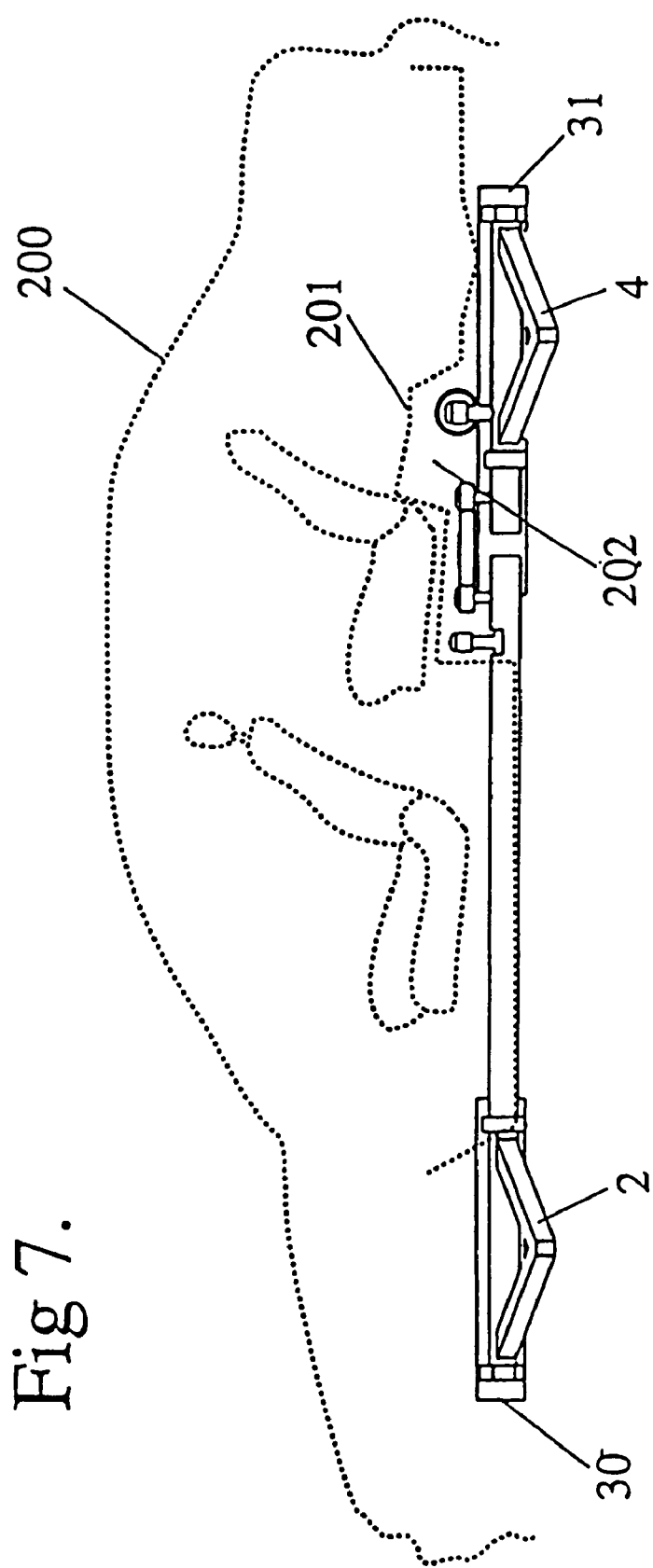
FIG. 7 is a side cross-sectional view of the suspension system of FIG. 6 mounted on a vehicle.

This vehicle suspension system arrangement can therefore move all of the components that take up vertical space towards the rear of the vehicle. This arrangement facilitates packaging of the vehicle suspension in a vehicle. Referring to FIG. 7, the suspension system of FIG. 6 is shown mounted on a vehicle 200. The typical shape of the vehicle floor 201 is such that clearance for the various components of the vehicle suspension system can be provided to the rear of the vehicle in a standard cavity 202 under the floor 201 of the vehicle.

Figure 8:
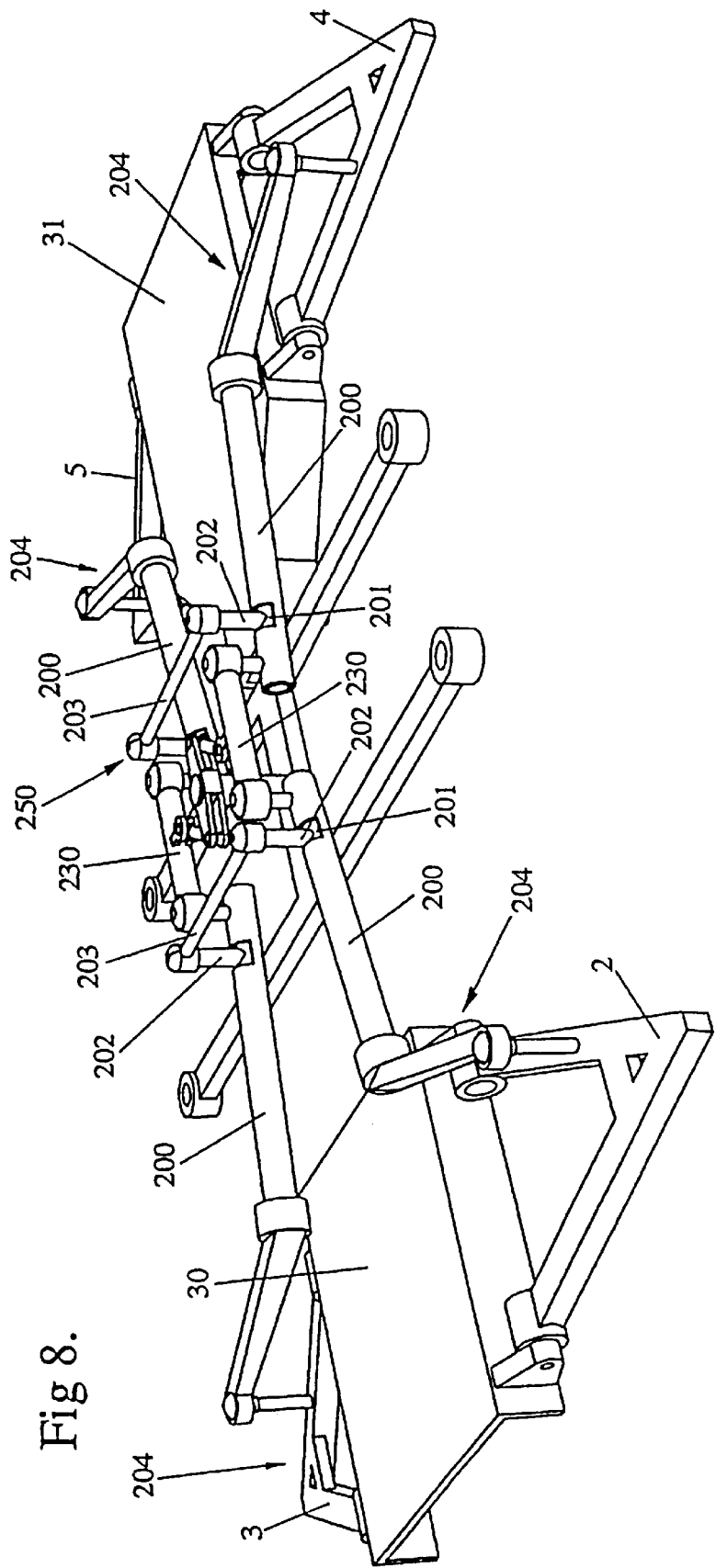
FIG. 8 is a perspective view of a sixth preferred embodiment of a vehicle suspension system according to the present invention.

Alternatively, it may be useful to arrange the components of the vehicle suspension system in an "X" configuration for packaging and other reasons as shown in FIG. 8. This arrangement has similarities with the arrangement shown for the front vehicle subframe 30,in FIG. 6 in that the vehicle front subframe 30 supports the front wishbones 2, 3 which are each connected to a roll tube 200, each roll tube 200 accommodating a torsion bar (not shown) therein. A bounce lever arm 202 extends from each torsion bar through an aperture 201 provided through the wall of the roll tube 200, and the laterally adjacent bounce lever arms 202 are joined by a rigid link member 202 in a similar manner to FIG. 6.

The primary differences are that the roll tubes 200 are connected by drop links 204 to their associated wishbone 2, 3 and that the roll tubes 200 are angled inwardly from the wishbones 2, 3 towards a generally central location of the vehicle. This location may for example be the hump provided under and between the front seats of a vehicle and above the drive shaft of the vehicle. The rear vehicle subframe 31 is also provided with a similar suspension arrangement to the arrangement provided for the front vehicle subframe 30. Therefore, roll tubes 200 are also connected by drop links 204 to the rear wishbones 4, 5, with the roll tubes 200 being angled inwardly to the said central location. The roll tubes 200 are therefore configured in an "X" configuration.

The roll tubes 200 are interconnected by link members 230 which are in turn connected by a Watts linkage 250 at the central location in a similar manner as in the earlier described arrangements. Furthermore, the bounce lever arms 202 and the rigid link members 203 are all located at the central location. This provides a compact arrangement for the various connection components of the suspension system within one location. Furthermore, this arrangement has mechanical advantages in that the load applied to the connection components are relatively lower than for other arrangements. Also most of the roll forces are resolved within this central location.

It is noted that the "Roll Split" or roll moment distribution for the suspension system can be altered by changing the attachment point of the transfer means with the link members in any of the above described arrangements. Also the transfer means can include resilient members to provide roll resilience.

In all of the above arrangements, the components of the suspension system are conveniently located away from the front and rear ends of the vehicle as required. This ensures that the suspension system does not interfere with the crumple zones of the vehicle. Furthermore, the various possible arrangements of the vehicle suspension system facilitate packaging of the system in conventional vehicles. This therefore facilitates the minimum number of design changes which need to be made to existing vehicle platforms.

Figure 9:
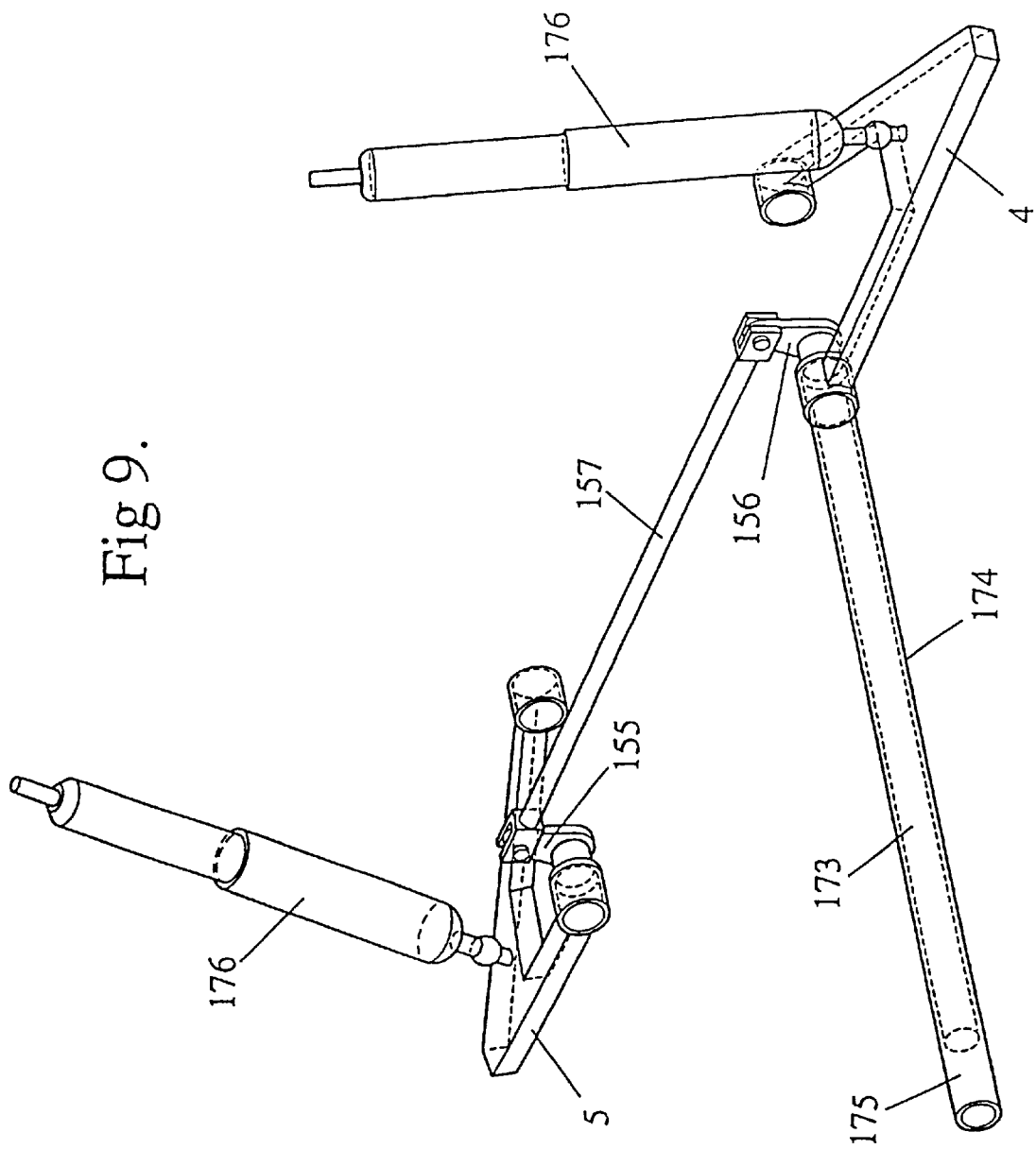
FIG. 9 is a perspective view of an alternative support means for use on a suspension system according to the present invention.

Referring now to FIG. 9, an alternative mechanical bounce support arrangement is illustrated applied to the rear pair of transversely adjacent of wheels with the vehicle chassis and the roll attitude control components omitted for clarity. The back right wishbone 5 has a first bounce lever arm 155 rigidly attached close to the axis of the rotation of the wishbone, a bounce tube 174 is rigidly attached close to the axis of rotation of the wishbone. A bounce tube 174 is rigidly attached to the back left wishbone 4 with the bounce torsion bar 173 attached to the tube at one end 175 by any known means such as a spline and extending back up inside the tube. The other end of the bounce torsion bar 173 back at the wheel end is connected to the second bounce lever arm 156. The first and second bounce lever arms are interconnected as before by the support connecting link 157.

Thus the torsion bar is loaded by the left wheel at its forward end 175 and loaded in the opposite direction by the right wheel at its rearward end providing resilient bounce support of the vehicle body. As the vehicle wheels move with respect to the body in roll or cross-axle articulation motions, the bounce lever arms, tube and torsion bar rotate, the support connecting link moves in a substantially lateral direction thereby substantially maintaining the same torque in the bounce torsion bar and consistent loading on the vehicle wheels.

Alternative height control means are also shown in FIG. 9 in the form of self-levelling dampers 176 are shown to help maintain vehicle ride height under differing load conditions.

The torsion bar arrangement has particular application on the rear suspension of vehicles as it may be possible to package the bounce torsion bar on one side of the vehicle only, the remainder of the space often being occupied by fuel tanks and exhaust system components. It is not necessary to rigidly fix the first bounce lever arm and the bounce tube to the respective wishbones, they being driven by intermediate linkages if desired.

The above "torsion bar within a tube" design may be used on both sides of the vehicle, with optionally, different length torsion bars from side to side if required.

In all of the above embodiments, it is possible to dampen roll motion if required by locating an external damper such as a conventional linear hydraulic cylinder damper between the vehicle body and each wheel mount.

What is claimed is:

1. A suspension system for a vehicle, the suspension system comprising:

two laterally spaced front wheel assemblies and two laterally spaced rear wheel assemblies, each wheel assembly including a wheel and a wheel mounting supporting the wheel to permit movement of the wheel in a generally vertical direction relative to a body of the vehicle;

bounce support means for supporting the vehicle body above the wheels and roll control means for controlling a roll attitude of the vehicle body with respect to the wheels;

said bounce support means for at least one end of the vehicle including at least one first coupling means interconnecting one wheel assembly to the laterally adjacent wheel assembly;

said roll control means including respective second coupling means interconnecting each wheel assembly to the longitudinally adjacent wheel assembly, and further including transfer means interconnecting the second coupling means of each said pair of longitudinally adjacent wheel assemblies;

said second coupling means including a roll lever arm for each wheel assembly, the second coupling means being adapted to urge in response to a movement of the wheel of one said wheel assembly in a substantially vertical direction a movement of the wheel of another said wheel assembly longitudinally spaced on the same side of the vehicle and connected to said same second coupling means in an opposing direction relative thereto;

said second coupling means also including average movement generating means arranged to generate a movement therein substantially proportional to the average movement of the two wheels connected thereto on one side of the vehicle, said generated average including a factor for the roll moment; distribution of the roll control means, the transfer means transferring said generated average movement of said second coupling means to the other said second coupling means on the opposite side of the vehicle;

wherein each average movement generating means includes a linkage member substantially aligned with a longitudinal axis of the vehicle, the linkage member having a flexible connection at each end thereof, one flexible connection connected to the roll lever arm for one said wheel assembly and the other flexible connection connected to the roll lever arm for the other said wheel assembly on the same side of the vehicle, the linkage member having a pivot point between the two flexible connections, the linkage member being able to rotate about the pivot point, the position of the pivot point being the factor for the roll moment distribution of the roll control means; and wherein said at least one first coupling means includes a bounce lever arm for each associated wheel assembly and at least one bounce torsion bar extending substantially longitudinally along each side of the vehicle, each said at least one bounce torsion bar interconnecting at least one said bounce lever arm with the associated wheel assembly, and the first coupling means further including a connection means interconnecting the bounce lever arm of one wheel assembly with the bounce lever arm of the laterally adjacent wheel assembly, said at least one first coupling means thereby supporting at least a portion of the load on the associated wheel assemblies whilst providing substantially zero roll or warp stiffness.

2. A suspension system according to claim 1, wherein at least one of said bounce support means include individual resilient support means between each wheel assembly and the vehicle body, thereby providing resilient support of the vehicle body and an additional roll stiffness to the suspension system.

3. A suspension system according to claim 1, wherein the loads generated in the transfer means are resolved in a roll load subframe which is resiliently mounted to the vehicle body.

4. A suspension system according to claim 3, wherein the front and rear wheel mountings are respectively located on seperate front and rear subforms.

5. A suspension system according to claim 3, wherein the front and rear wheel mountings are respectively located on separate front and rear subframes, the roll load subframe forming an integral part of at least one of the front or rear subframes.

6. A suspension system according to claim 1, wherein each second coupling means includes at least one elongate torsion member connected to a said wheel mounting, the associated said roll lever arm extending from each torsion member.

7. A suspension system according to claim 1, wherein the second coupling means includes a pair of elongate torsion members, one end of each said torsion member being connected to and extending from a said wheel mounting, the other end of each torsion member including a roll lever arm extending from the torsion member, the roll lever arms being interconnected to by a linkage arrangement, the linkage arrangement of adjacent second coupling means being interconnected by the transfer means.

8. A suspension system according to claim 1, wherein the major rotational axes of the components of the first and second coupling means are generally aligned towards a structural area where loads from the first and second coupling means are resolved.

9. A suspension system according to claim 1, wherein the transfer means includes a Watts link.

10. A suspension system according to claim 1, wherein the roll lever arms of one said second coupling means point substantially upwards and the roll lever arms of the other second coupling means on the opposite side of the vehicle point substantially downwards; and wherein the transfer means interconnecting the linkage means is a member which is substantially aligned with a transverse axis across the vehicle.

11. A suspension system according to claim 1, wherein at least one of the first coupling means includes at least one torsion bar interconnected between at least one wheel assembly and the associated bounce lever arm.

12. A suspension system according to claim 1, wherein the torsion members of at least one second coupling means are hollow, a said torsion bar of the first coupling means being located within each said torsion member.

13. A suspension system according to claim 12, wherein the bounce lever arm extends through an aperture provided through a wall of the torsion member.

14. A suspension system according to claim 1, wherein the connection means is a relatively rigid member interconnecting the bounce lever arms of laterally adjacent torsion bars.

15. A suspension system according to claim 1, wherein the connection means interconnecting the bounce lever arms of laterally adjacent torsion bars includes a resilient means.

16. A suspension system according to claim 15, wherein the resilient means includes a hydraulic ram in fluid communication with an accumulator.

17. A suspension system according to claim 15, wherein the resilient means includes a spring member.

18. A suspension system according to claim 2, wherein the bounce support means of at least one pair of said laterally adjacent wheel assemblies further includes a pair of fluid rams, the fluid rams being respectively connected to the wheel mounts of laterally adjacent wheel assemblies, the hydraulic rams being connected by a fluid conduit to provide fluid communication therebetween, and an accumulator located on the fluid conduit.

19. A suspension system according to claim 2, wherein the loads generated in the transfer means are resolved in a roll load subframe which is resiliently mounted to the vehicle body.

20. A vehicle having a suspension system, the suspension system comprising:

two laterally spaced front wheel assemblies and two laterally spaced rear wheel assemblies, each wheel assembly including a wheel, and a wheel mounting supporting the wheel to permit movement of the wheel in a generally vertical direction relative to a body of the vehicle;

bounce support means for supporting the vehicle body above the wheels and roll control means for controlling a roll attitude of the vehicle body with respect to the wheels;

said bounce support means for at least one end of the vehicle including at least one first coupling means interconnecting one wheel assembly to the laterally adjacent wheel assembly;

said roll control means including respective second coupling means interconnecting each wheel assembly to the longitudinally adjacent wheel assembly, and further including transfer means interconnecting the second coupling means of each said pair of longitudinally adjacent wheel assemblies;

said second coupling means including a roll lever arm for each wheel assembly, the second coupling means being adated to urge in response to a movement of the wheel of one said wheel assembly in a substantially vertical direction a movement of the wheel of another said wheel assembly longitudinally spaced on the same side of the vehicle and connected to said same second coupling means in an opposing direction relative thereto;

said second coupling means also including average movement generating means arranged to generate a movement therein substantially proportional to the average movement of the two wheels connected thereto on one side of the vehicle, said generated average including a factor for the roll moment distribution of the roll control means, the transfer means transferring said generated average movement of said second coupling means to the other said second coupling means on the opposite side of the vehicle, wherein each average movement generating means includes a linkage member substantially aligned with a longitudinal axis of the vehicle, the linkage member having a flexible connection at each end thereof, one flexible connection connected to the roll lever arm for one said wheel assembly and the other flexible connection connected to the roll lever arm for the other said wheel assembly on the same side of the vehicle, the linkage member having a pivot point between the two flexible connections, the linkage member being able to rotate about the pivot point, the position of the pivot point being the factor for the roll moment distribution of the roll control means.

21. The vehicle having a suspension system according to claim 20, wherein said at least one first coupling means includes a bounce lever arm for each associated wheel assembly and at least one bounce torsion bar extending substantially longitudinally along each side of the vehicle.

* * * * *